US012335696B2

(12) United States Patent
Liu

(10) Patent No.: US 12,335,696 B2
(45) Date of Patent: Jun. 17, 2025

(54) MICROPHONE DEVICE AND AUDIO SIGNAL PROCESSING METHOD

(71) Applicant: AVER INFORMATION INC., New Taipei (TW)

(72) Inventor: Ming-Yu Liu, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 273 days.

(21) Appl. No.: 18/132,339

(22) Filed: Apr. 7, 2023

(65) Prior Publication Data

US 2023/0328431 A1 Oct. 12, 2023

(30) Foreign Application Priority Data

Apr. 8, 2022 (TW) ................................. 111113386

(51) Int. Cl.
*H04R 3/00* (2006.01)
*H04R 1/40* (2006.01)
*H04R 29/00* (2006.01)

(52) U.S. Cl.
CPC ............. *H04R 3/005* (2013.01); *H04R 1/406* (2013.01); *H04R 29/005* (2013.01); *H04R 2201/401* (2013.01)

(58) Field of Classification Search
CPC ...... H04R 3/005; H04R 1/406; H04R 29/005; H04R 2201/401
USPC .................................... 381/58, 91, 111, 122
See application file for complete search history.

(56) References Cited

U.S. PATENT DOCUMENTS

| | | | | |
|---|---|---|---|---|
| 5,838,284 | A * | 11/1998 | Dougherty | H01Q 3/26 343/893 |
| 6,205,224 | B1 * | 3/2001 | Underbrink | H04R 1/403 343/893 |
| 9,191,741 | B1 * | 11/2015 | Brusniak | H04R 3/005 |
| 9,280,984 | B2 | 3/2016 | Chen et al. | |
| 9,930,448 | B1 * | 3/2018 | Chen | H04R 3/005 |
| 9,936,291 | B2 | 4/2018 | Christoph | |
| 10,873,805 | B2 | 12/2020 | Chang et al. | |
| 11,553,294 | B2 * | 1/2023 | Kanemaru | H04R 29/005 |
| 2007/0274534 | A1 * | 11/2007 | Lockhart | H04R 1/406 381/92 |

(Continued)

FOREIGN PATENT DOCUMENTS

| | | | |
|---|---|---|---|
| CN | 104581463 | A | 4/2015 |
| TW | I543149 | B | 7/2016 |
| TW | 202009927 | A | 3/2020 |

*Primary Examiner* — William A Jerez Lora
(74) *Attorney, Agent, or Firm* — Maschoff Brennan

(57) ABSTRACT

A microphone device includes a first circuit board, a plurality of first microphones and a plurality of second microphones. The first microphones are disposed on the first circuit board and arranged along a first spiral about the reference point. The second microphones are disposed on the first circuit board and arranged along a second spiral about the reference point, wherein the second spiral is non-overlapped with the first spiral. The first microphones and the second microphones are point-symmetrical with respect to the reference point, the first microphones and the second microphones form a plurality of microphone sets, and each of the microphone sets comprises one of the first microphones and one of the second microphones which are point-symmetrical with respect to the reference point.

11 Claims, 8 Drawing Sheets

(56) References Cited

U.S. PATENT DOCUMENTS

| | | | | |
|---|---|---|---|---|
| 2015/0319524 A1* | 11/2015 | Wang | G01S 15/42 | |
| | | | 381/92 | |
| 2016/0216357 A1* | 7/2016 | Schultz | H04R 3/005 | |

* cited by examiner

MICROPHONE DEVICE AND AUDIO SIGNAL PROCESSING METHOD

CROSS-REFERENCE TO RELATED APPLICATIONS

This non-provisional application claims priority under 35 U.S.C. § 119(a) on Patent Application No(s). 111113386 filed in Taiwan, R.O.C. on Apr. 8, 2022, the entire contents of which are hereby incorporated by reference.

TECHNICAL FIELD

The disclosure relates to a microphone device and an audio signal processing method, more particularly to a microphone device having a plurality of microphones arranged along a spiral and an audio signal processing method using the microphone device to process an audio signal.

BACKGROUND

As technology progresses, an electronic device, such as a laptop computer, a tablet computer, a smart phone or a video device, usually has a microphone device to receive audio signals, such that the audio signals can be stored or transmitted to another apparatus.

In order to improve a sound receiving quality of the microphone device, there may be a plurality of microphone units in the microphone device. In general, the more the quantity of the microphone units is, the better the sound receiving quality of the microphone device is, but the manufacturing costs of the microphone device will increase accordingly. Therefore, how to maintain the sound receiving quality without significantly increasing the manufacturing costs of the microphone device is one of the crucial topics in this field.

SUMMARY

The disclosure provides a microphone device and an audio signal processing method which can maintain the sound receiving quality without significantly increasing the manufacturing costs of the microphone device.

One embodiment of the disclosure provides a microphone device. The microphone device includes a first circuit board, a plurality of first microphones and a plurality of second microphones. The first microphones are disposed on the first circuit board and arranged along a first spiral about the reference point. The second microphones are disposed on the first circuit board and arranged along a second spiral about the reference point, wherein the second spiral is non-overlapped with the first spiral. The first microphones and the second microphones are point-symmetrical with respect to the reference point, the first microphones and the second microphones form a plurality of microphone sets, and each of the microphone sets comprises one of the first microphones and one of the second microphones which are point-symmetrical with respect to the reference point.

Another embodiment of the disclosure provides an audio signal processing method. The audio signal processing method includes receiving an original audio signal via the aforementioned microphone sets, performing a Fourier transformation and a frequency band classification to the original audio signal so as to obtain beams of all of frequency bands of the original audio signal received by each of the microphones sets, according to an applicable frequency band of each of the microphone sets recorded in a predetermined comparison table, selecting a beam of the applicable frequency band of each of the microphone sets from the beams of all of the frequency bands of the original audio signal received by each of the microphone sets, to perform a beamforming process for obtaining a combined beam pattern, performing an inverse Fourier transformation to the combined beam pattern so as to obtain a processed audio signal, and outputting the processed audio signal.

According to the microphone device and the audio signal processing method as discussed in the above embodiments, the first microphones are arranged along the first spiral about the reference point, the second microphones are arranged along the second spiral non-overlapped with the first spiral about the reference point, and the first microphones and the second microphones are point-symmetrical with respect to the reference point, such that the microphone device can achieve a desired sound receiving quality in a specific frequency band with less microphones, thereby maintaining the sound receiving quality and preventing the manufacturing costs from significantly increasing.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
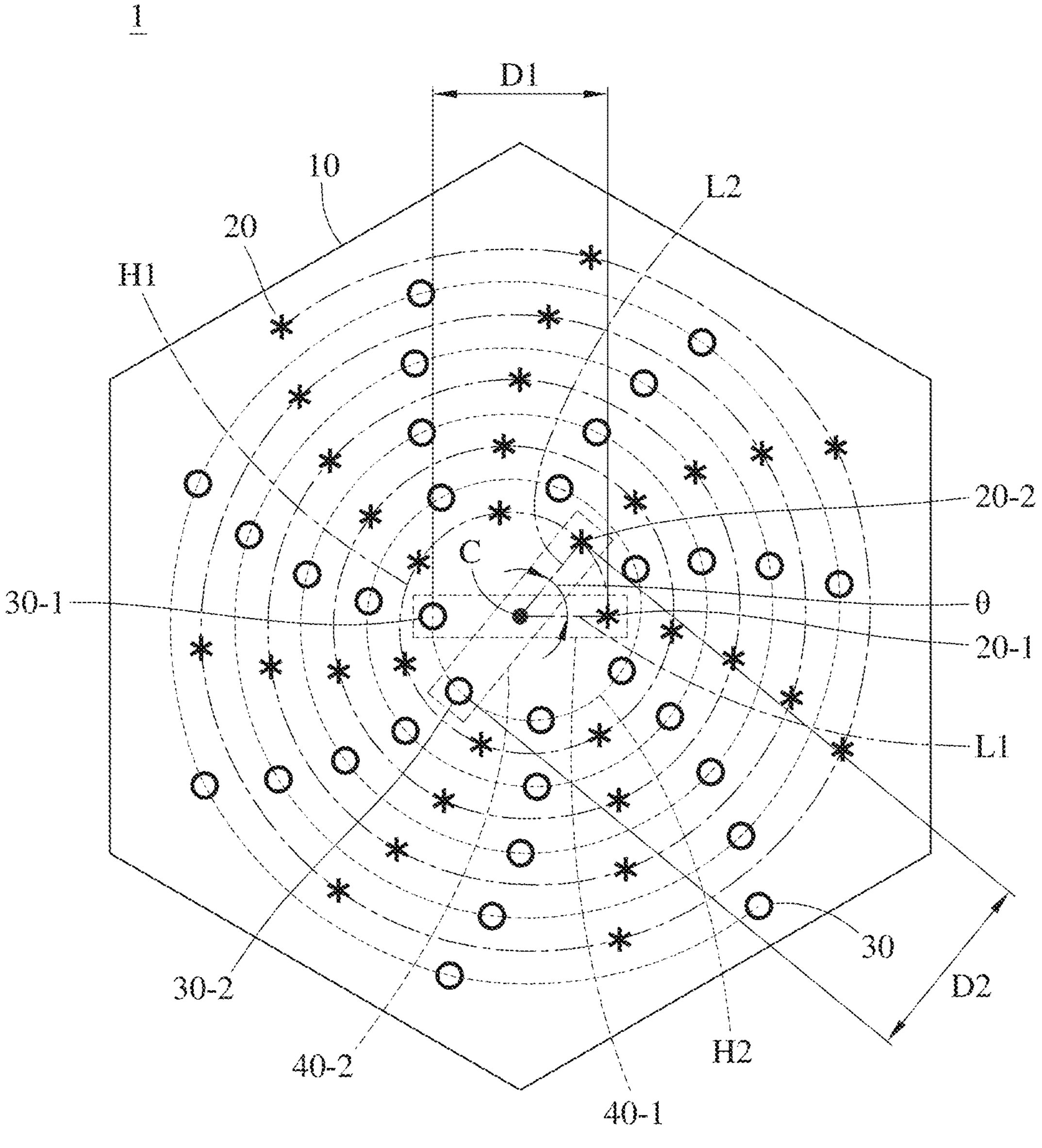
FIG. 1 is a schematic view of a microphone device according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Refer to FIG. 1, where FIG. 1 is a schematic view of a microphone device 1 according to a first embodiment of the disclosure.

In this embodiment, the microphone device 1 includes a first circuit board 10, a plurality of first microphones 20 and a plurality of second microphones 30.

In this embodiment, the first circuit board 10 has a reference point C. The quantity of the first microphones 20 is 32, and the quantity of the second microphones 30 is 32. The first microphones 20 are disposed on the first circuit board 10, and the second microphones 30 are disposed on the first circuit board 10. In order to clearly show the arrangements of the first microphones 20 and the second microphones 30, the first microphones 20 are presented by "*", and the second microphones 30 are presented by "o" in FIG. 1. The first microphones 20 are arranged along a first spiral H1 about the reference point C, and the second microphones 30 are arranged along a second spiral H2 about the reference point C, where the second spiral H2 is non-overlapped with the first spiral H1. Each of the first spiral H1 and the second spiral H2 may be an Archimedean spiral, a logarithmic spiral, a Fermat spiral, a hyperbolic spiral, a lituus or a combination thereof, but the disclosure is not limited thereto.

The first microphones 20 and the second microphones 30 are point-symmetrical with respect to the reference point C; that is, after the second microphones 30 are rotated 180 degrees, the second microphones 30 are overlapped with the first microphones 20. The first microphones 20 and the second microphones 30 form a plurality of microphone sets 40, and each of the microphone sets 40 includes one of the first microphones 20 and one of the second microphones 30 which are point-symmetrical with respect to the reference point C. For example, as shown in FIG. 1, one first microphones 20 and one second microphone 30 enclosed by the dash-line frame together form one microphone set 40.

In this embodiment, two lines L1 and L2 that respectively connect any adjacent two of the first microphones 20 arranged along the first spiral H1 to the reference point C form an angle θ. In one embodiment, the angles θ are equal to one another. In one embodiment, the angles θ may fall within a range from 40 degrees to 70 degrees. In addition, in two adjacent microphone sets 40, a difference between a distance between the first microphone 20 and the second microphone 30 of one microphone set 40 and a distance between the first microphone 20 and the second microphone 30 of the other microphone set 40 falls within a range. Specifically, the so-called two adjacent microphone sets 40 are formed by the adjacent two first microphones 20-1 and 20-2 of the first microphones 20 arranged along the first spiral H1 sequentially and the second microphones 30-1 and 30-2 which are respectively point-symmetrical to the first microphones 20-1 and 20-2 and arranged along the second spiral H2. As shown in FIG. 1, a distance D1 between the first microphone 20-1 and the second microphone 30-1 of one microphone set 40-1 is smaller than a distance D2 between the first microphone 20-1 and the second microphone 30-1 of another one microphone set 40-1; that is, the distance D1 is not equal to the distance D2, and the difference between the distances D1 and D2 may be fall within a range from 0.25 cm to 0.5 cm, but the disclosure is not limited thereto.

Figure 2:
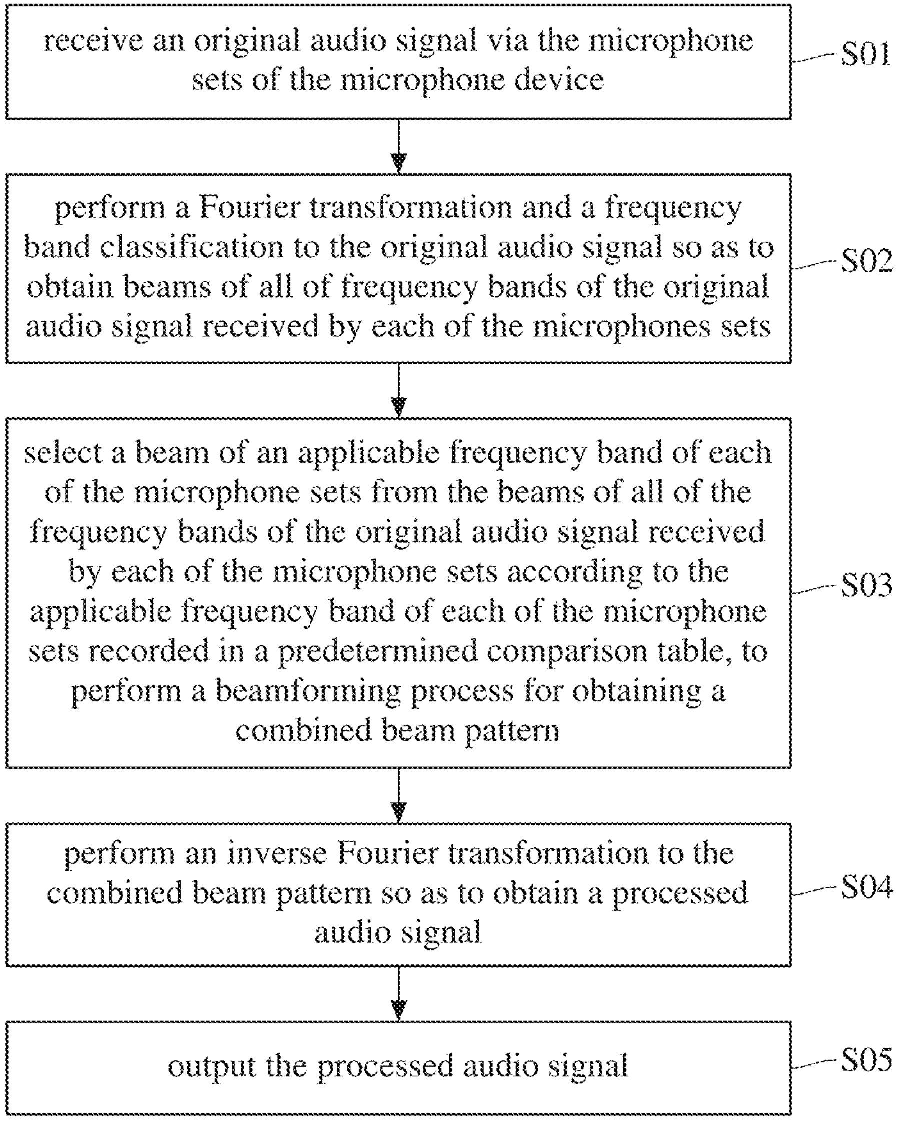
FIG. 2 is a flow chart of an audio signal processing method cooperated with the microphone device in FIG. 1.

Then, the following paragraphs will introduce an audio signal processing method cooperated with the microphone device 1. Refer to FIG. 2, where FIG. 2 is a flow chart of an audio signal processing method cooperated with the microphone device 1 in FIG. 1.

The audio signal processing method includes steps S01 to S05. Firstly, the step S01 is performed to receive an original audio signal via the microphone sets 40 of the microphone device 1. Then, the step S02 is performed to perform a Fourier transformation and a frequency band classification to the original audio signal so as to obtain beams of all of frequency bands of the original audio signal received by each of the microphones sets 40. Then, the step S03 is performed to select a beam of an applicable frequency band of each of the microphone sets 40 from the beams of all of the frequency bands of the original audio signal received by each of the microphone sets 40 according to the applicable frequency band of each of the microphone sets 40 recorded in a predetermined comparison table, to perform a beamforming process for obtaining a combined beam pattern. The aforementioned beamforming process may be delay and sum beamforming, minimum variance distortionless response beamforming or generalized sidelobe canceller. Then, the step S04 is performed to perform an inverse Fourier transformation to the combined beam pattern so as to obtain a processed audio signal. Then, the step S05 is performed to output the processed audio signal.

In step S03, the applicable frequency band of each of the microphone sets 40 recorded in the predetermined comparison table is obtained by a similarity analysis. The similarity analysis includes determining whether a similarity between a test beam pattern of each of the frequency bands produced after each of the microphone set 40 receives a test audio signal and an ideal beam pattern is greater than a threshold. If yes, the frequency band corresponding to the test beam pattern is determined to be an applicable frequency band of the microphone set 40 corresponding to the test beam pattern. In contrast, if not, the frequency band corresponding to the test beam pattern is determined not an applicable frequency band of the microphone set 40 corresponding to the test beam pattern.

Figure 3:
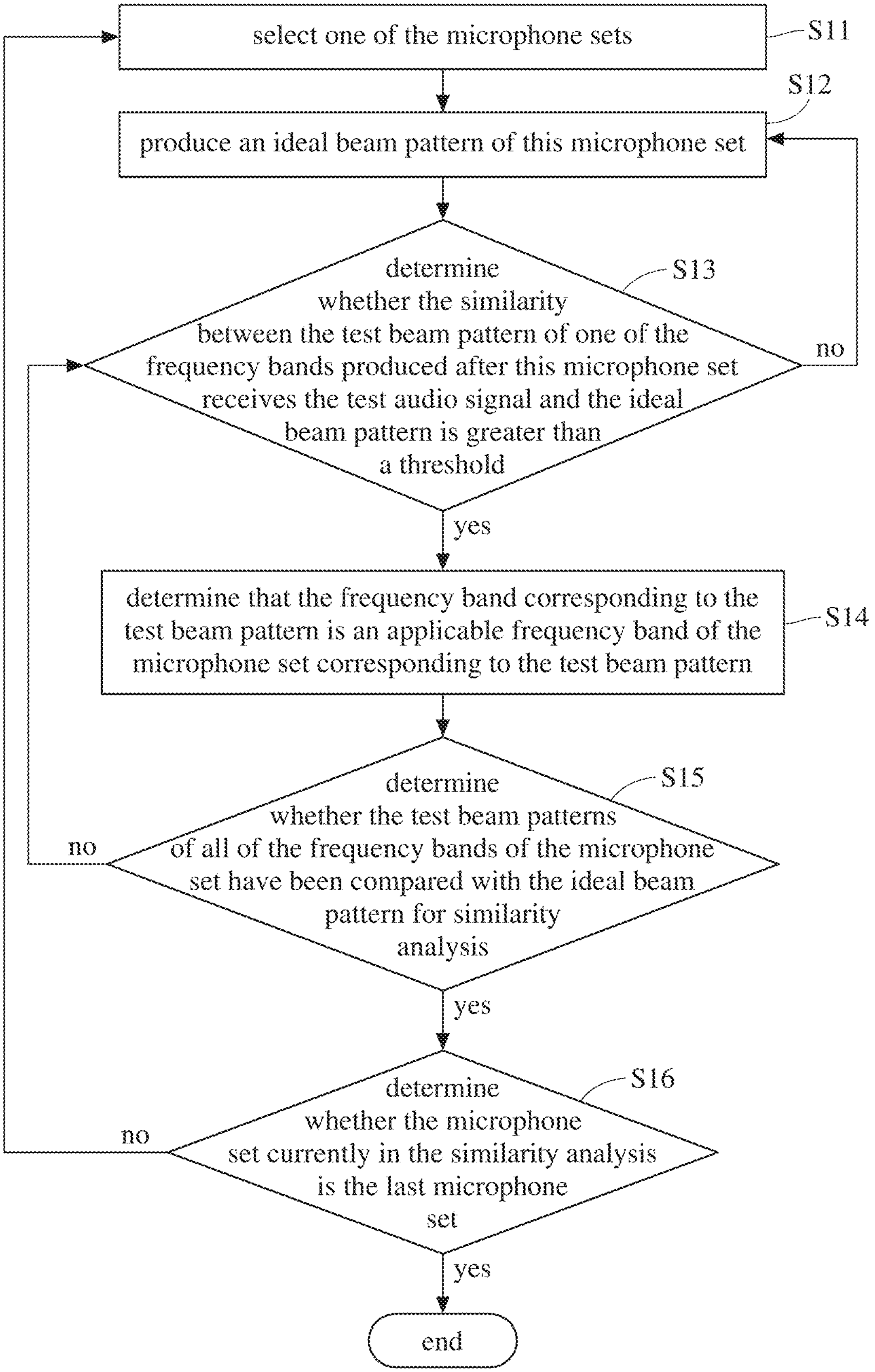
FIG. 3 is a flow chart of a similarity analysis which is performed to build a predetermined comparison table.

The following paragraphs will further introduce the similarity analysis. Refer to FIG. 3, where FIG. 3 is a flow chart of the similarity analysis which is performed to build the predetermined comparison table. Firstly, the step S11 is performed to select one of the microphone sets 40. Then, the step S12 is performed to produce an ideal beam pattern of this microphone set 40. Then, the step S13 is performed to determine whether the similarity between the test beam pattern of one of the frequency bands produced after this microphone set 40 receives the test audio signal and the ideal beam pattern is greater than a threshold. In the step S13, when the similarity between the test beam pattern and the ideal beam pattern is greater than the threshold, the step S14 is performed to determine that the frequency band corresponding to the test beam pattern is an applicable frequency band of the microphone set 40 corresponding to the test beam pattern. In the step S13, when the similarity between the test beam pattern and the ideal beam pattern is not greater than the threshold, the step S13 is performed again to determine whether the similarity between the test beam pattern of another one of the frequency bands and the ideal beam pattern is greater than the threshold.

Figure 4:
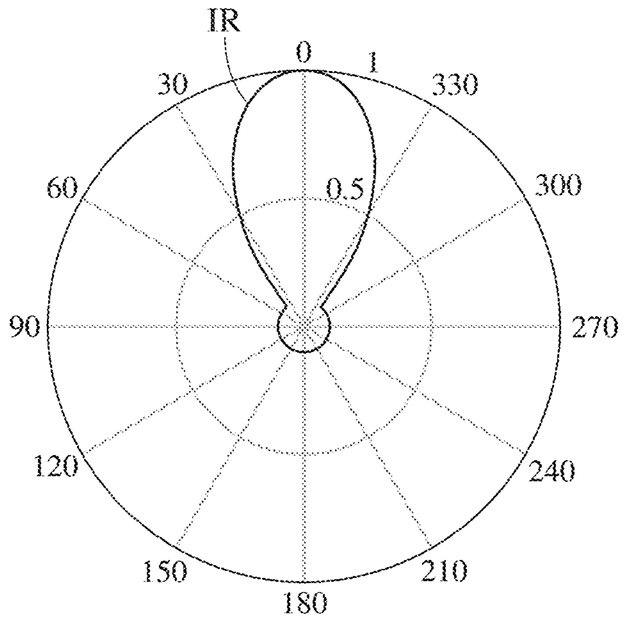
FIG. 4 is a diagram of an ideal beam pattern of a microphone set.
Figure 5:
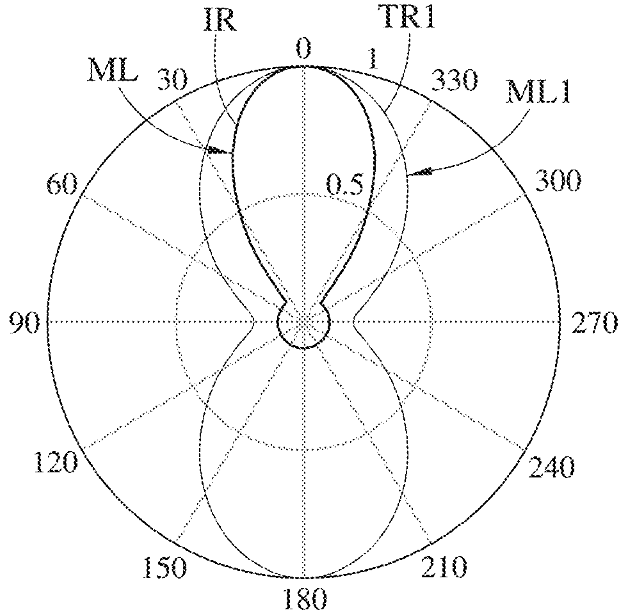
FIGS. 5 and 6 are diagrams each showing that a test beam pattern and the ideal beam pattern overlapped with each other.
Figure 6:
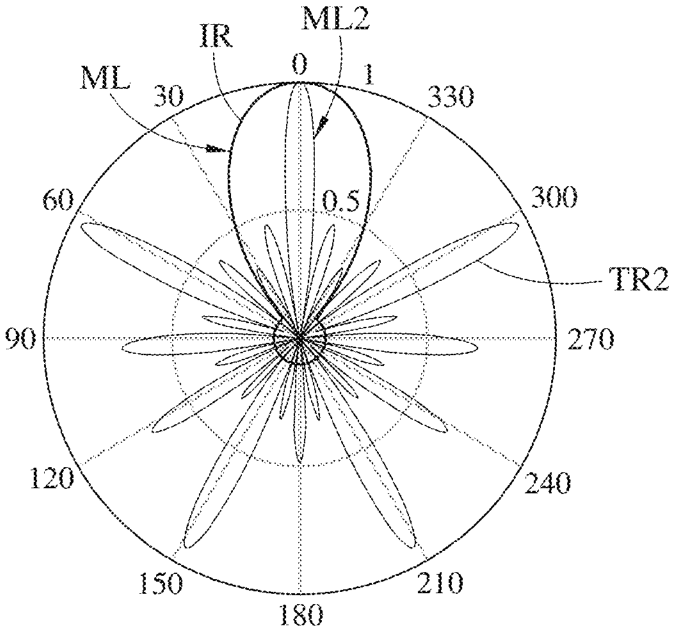

For example, refer to FIGS. 3 to 6. FIG. 4 is a diagram of the ideal beam pattern of the microphone set. FIGS. 5 and 6 are diagrams each showing that the test beam pattern and the ideal beam pattern overlapped with each other. In the step S11, a first microphone set 40 is firstly selected. Then, the step S12 is performed to produce an ideal beam pattern IR of the first microphone set 40 (as shown in FIG. 4), where an ideal sound receiving range falls between −30 degrees and 30 degrees. In step S13, whether the similarity between the test beam pattern and the ideal beam pattern is greater than the threshold can be determined by overlapping them and determining whether an overlapping area between the test beam pattern and the ideal beam pattern is greater than a threshold. Assuming that a test beam pattern TR1 in FIG. 5 is the test beam pattern TR1 of a first frequency band (e.g., 500 Hz to 525 Hz) produced after the first microphone set 40 receives the test audio signal, there is a relative large overlapping area between a main lobe ML1 of the test beam pattern TR1 in FIG. 5 and a main lobe ML of the ideal beam pattern IR, and the overlapping area between them is greater than the threshold, which represents that the test ideal pattern TR1 in FIG. 5 and the ideal beam pattern IR have a great similarity therebetween, and thus, it is determined that the first frequency band is an applicable frequency band of the first microphone set 40 corresponding to the test beam pattern TR1. On the other hand, assuming that a test beam pattern TR2 in FIG. 6 is the test beam pattern TR2 of a second frequency band (e.g., 575 Hz to 600 Hz) produced after the first microphone set 40 receives the test audio signal, there is a relative small overlapping area between a main lobe ML2 of the test beam pattern TR2 in FIG. 6 and the main lobe ML of the ideal beam pattern IR, and the overlapping area between them is smaller than the threshold, which represents that the test ideal pattern TR2 in FIG. 6 and the ideal beam pattern IR have a poor similarity therebetween, and thus, it is determined that the second frequency band is not an applicable frequency band of the first microphone set 40 corresponding to the test beam pattern TR2.

After the step S14, the step S15 is performed to determine whether the test beam patterns of all of the frequency bands of the microphone set 40 have been compared with the ideal beam pattern for similarity analysis. If not in the step S15, the step S13 is performed again to compare one of the rest test beam patterns of the microphone set 40 with the ideal beam pattern for similarity analysis. If yes in the step S15, the step S16 is performed to determine whether the microphone set 40 currently in the similarity analysis is the last microphone set 40. If not in the step S16, the step S11 is performed again to choose one of the rest microphone sets 40 to perform the similarity analysis. If yes in the step S16, the similarity analysis ends.

Figure 7:
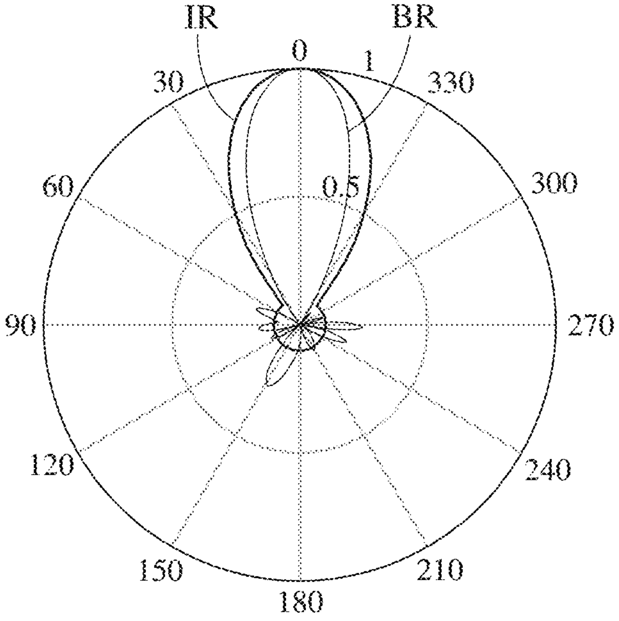
FIG. 7 is a diagram of an optimal beam pattern of one frequency band which is overlapped with the ideal beam pattern.
Figure 8:
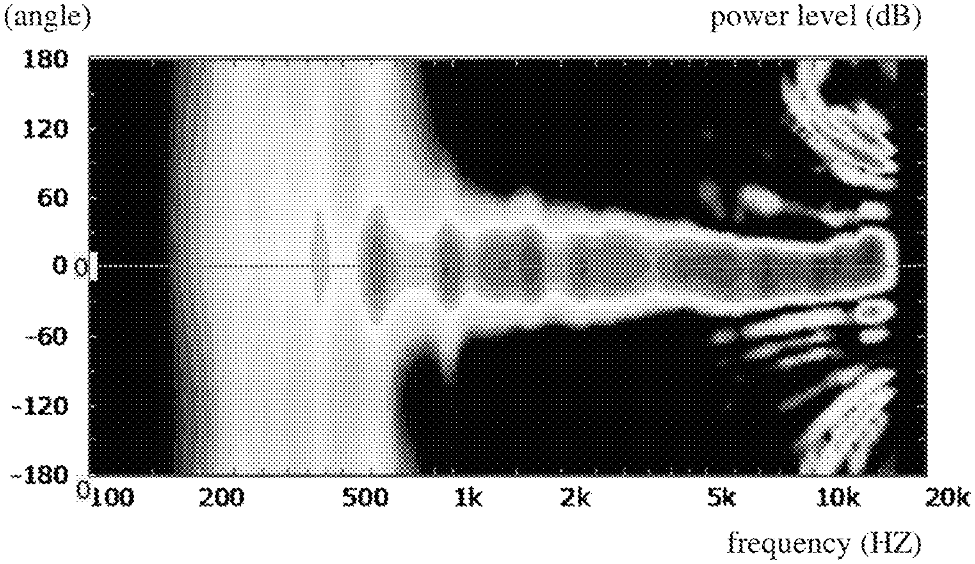
FIG. 8 is a diagram of a combined beam pattern produced from the optimal beam patterns of all frequency bands after a beamforming process.

In this embodiment, the predetermined comparison table has already recorded the applicable frequency band of each microphone set 40. Therefore, in the step S03 of the audio signal processing method, the beam of the applicable frequency band of each microphone set 40 is selected from the beams of all of the frequency bands of the original audio signal received by each of the microphone sets 40, and the selected beams of each frequency band are combined, such that an optimal beam pattern of each frequency band can be obtained. For example, refer to FIG. 7, where FIG. 7 is a diagram of the optimal beam pattern BR of one frequency band which is overlapped with the ideal beam pattern IR. When the predetermined comparison table records the first to fourth microphone sets 40 are suitable for receiving a sound of one frequency band (e.g., 500 Hz to 525 Hz), in the step S03, the beams of such frequency band (e.g., 500 Hz to 525 Hz) of the original audio signal received by the first to fourth microphone sets 40 are selected, and these beams are combined to form the optimal beam pattern BR of this frequency band. As shown in FIG. 7, the optimal beam pattern BR and the ideal beam pattern IR has a similar sound receiving range, and optimal beam pattern BR has less side lobes. Then, refer to FIG. 8, where FIG. 8 is a diagram of a combined beam pattern produced from the optimal beam patterns of all frequency bands after the beamforming process. After the optimal beam pattern of each frequency band is obtained, the beamforming process is performed to combine these optimal beam patterns to be the combined beam pattern. It can be seen in FIG. 8 that, in a high frequency band (e.g., 1 kHz to 20 kHz), the shape of the main lobe of the combined beam pattern produced by the microphone device 1 is smooth, and the combined beam pattern has less side lobes.

Accordingly, the first microphones 20 are arranged along the first spiral H1 about the reference point C, the second microphones 30 are arranged along the second spiral H2 non-overlapped with the first spiral H1 about the reference point C, and the first microphones 20 and the second microphones 30 are point-symmetrical with respect to the reference point C, such that the microphone device 1 can achieve a desired sound receiving quality in a specific frequency band with less microphones, thereby maintaining the sound receiving quality and preventing the manufacturing costs from significantly increasing.

In addition, the arrangements of the microphones can reduce the quantity of the microphones of the microphone device 1, such that a circuit board of smaller size can be adopted to support these microphones. Therefore, the size of the microphone device 1 can be reduced due to the smaller circuit board, while the manufacturing costs of the microphone device 1 can be reduced.

In this embodiment, in two adjacent microphone sets 40, the difference between the distance D1 between the first microphone 20 and the second microphone 30 of one microphone set 40 and the distance D2 between the first microphone 20 and the second microphone 30 of the other microphone set 40 falls within a range from 0.25 cm to 0.5 cm, the lines L1 and L2 that respectively connect any adjacent two of the first microphones 20 arranged along the first spiral H1 in sequence to the reference point C form the angle θ, the angles θ are equal to each other, and the angles may fall within the range from 40 degrees to 70 degrees, such that the quantity of the microphones can be ensured to be not too large and not too small, and the sound receiving quality can be maintained. However, the aforementioned arrangements are not restricted in the disclosure and may be properly modified according actual requirements.

Figure 9:
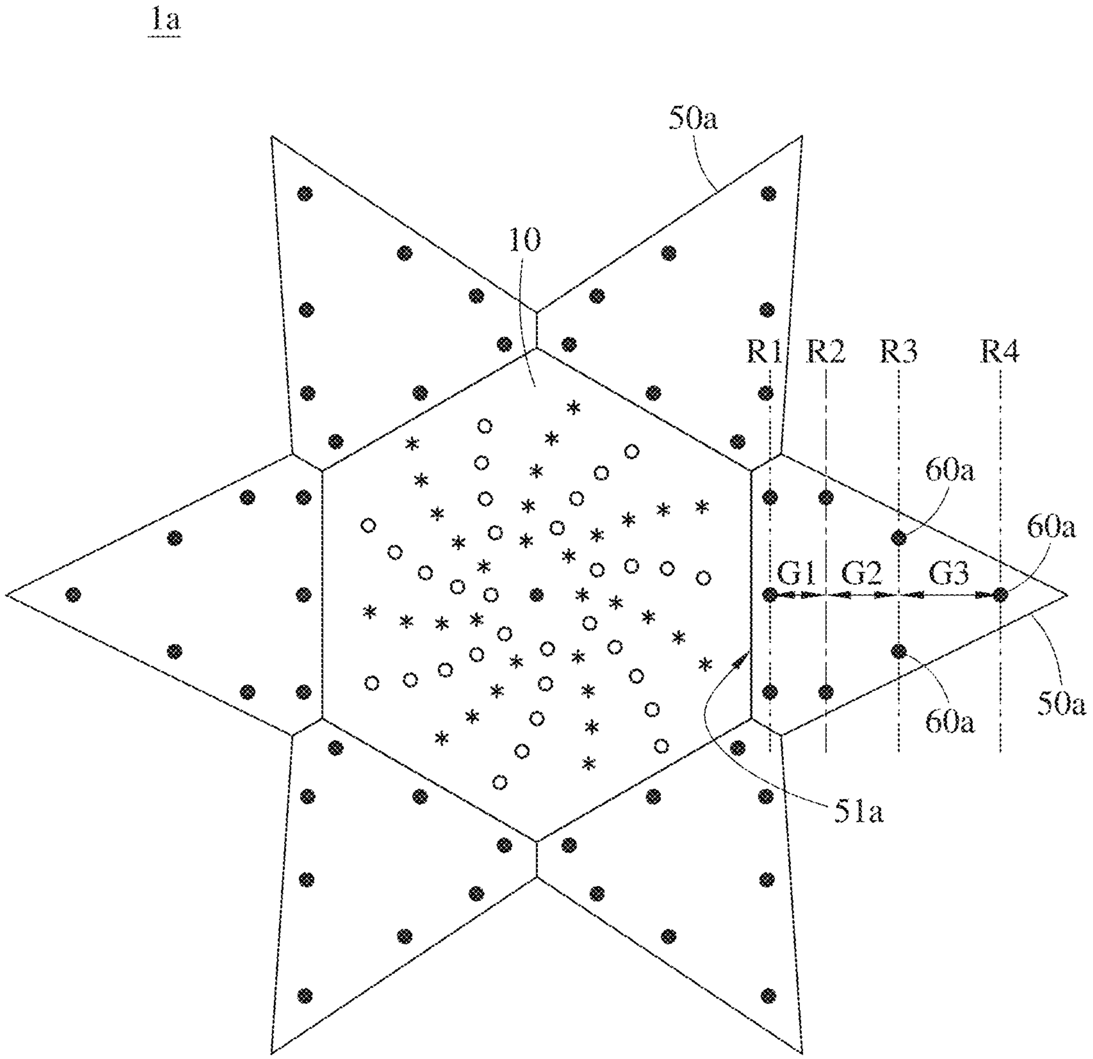
FIG. 9 is a schematic view of a microphone device according to a second embodiment of the disclosure.
Figure 10:
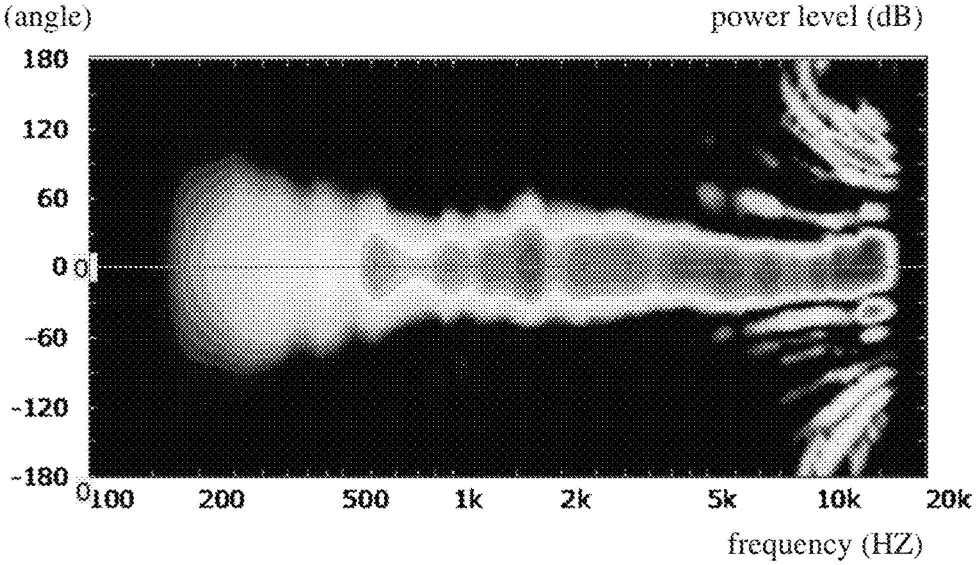
FIG. 10 is a diagram of a combined beam pattern produced from optimal beam patterns of all frequency bands after a beamforming process.

Then, refer to FIGS. 9 and 10, where FIG. 9 is a schematic view of a microphone device 1*a* according to a second embodiment of the disclosure, and FIG. 10 is a diagram of a combined beam pattern produced from optimal beam patterns of all frequency bands after a beamforming process.

The microphone device 1*a* of this embodiment is similar to the microphone device 1 with reference to FIG. 1, and the difference between them is that the microphone device 1*a* of this embodiment further includes a plurality of second circuit boards 50*a* and a plurality of third microphones 60*a*. Therefore, the following paragraphs mainly introduce the second circuit boards 50*a* and the third microphones 60*a*, and other components can be referred to the aforementioned paragraphs of the microphone device 1 with reference to FIG. 1 and will not be further introduced again hereinafter.

In this embodiment, the first circuit board 10 has a symmetrical polygon shape, such as hexagonal shape, but the disclosure is not limited thereto. Each of the second circuit boards 50*a* has a side 51*a*. The sides 51*a* of the second circuit boards 50*a* are connected to a periphery of the first circuit board 10. For example, the first circuit board 10 and the second circuit boards 50*a* together form a hexagram shape.

The third microphones 60*a* are disposed on the second circuit boards 50*a*, and there are eight third microphones 60*a* disposed on each of the second circuit boards 50*a* and arranged along a periphery of each of the second circuit boards 50*a*. The third microphones 60*a* on each of the second circuit boards 50*a* are arranged in the same manner, and thus the following paragraphs merely introduce the arrangement of the third microphones 60*a* on one of the second circuit boards 50*a*.

A plurality of reference lines R1 to R4 are defined to be parallel to the side 51*a* of the second circuit board 50*a*. Any adjacent two of the reference lines are spaced apart from each other by a distance, and these distances G1 to G3 gradually increase along a direction away from the side 51*a* of the second circuit board 50*a*, and the third microphones 60*a* are disposed on the reference lines R1 to R4. The reference lines R1 to R4 are respectively a first reference line R1, a second reference line R2, a third reference line R3 and a fourth reference line R4 from near to far from the side 51*a* of the second circuit board 50*a*. The distance G1 between the first reference line R1 and the second reference line R2 is smaller than the distance G2 between the second reference line R2 and the third reference line R3, and the distance G2 between the second reference line R2 and the third reference line R3 is smaller than the distance G3 between the third reference line R3 and the fourth reference line R4. Among the third microphones 60*a*, the quantities of the third microphones 60 on the first reference line R1, the second reference line R2, the third reference line R3 and the fourth reference line R4 gradually decrease along the direction away from the side 51*a* of the second circuit board 50*a*, or the quantities of the third microphones 60*a* on adjacent two of the reference lines may be equal to each other. For example, the quantities of the third microphones 60 on the first reference line R1, the second reference line R2, the third reference line R3 and the fourth reference line R4 are respectively 3, 2, 2 and 1.

Then, after the microphone device 1*a* of this embodiment receives an original audio signal, a combined beam pattern shown in FIG. 10 is obtained through the audio signal processing method with reference to FIGS. 2 and 3. Comparing FIG. 10 with FIG. 8, it can be seen that, in a low frequency band (e.g., below 1 kHz), the microphone device 1*a* has a significant directivity to the sound of such frequency band, and thus the microphone device 1*a* has a good sound receiving quality to the sounds of high frequency and low frequency.

Note that the quantity and the arrangement of the third microphones 60*a* on the second circuit boards 50*a* are not restricted in the disclosure and may be modified according to actual requirements.

Moreover, the shape of the first circuit board 10 and the overall shape of the first circuit board 10 and the second circuit boards 50*a* are not restricted in the disclosure and may be modified according to actual requirements.

In addition, the quantity of the second circuit boards 50*a* is not restricted in the disclosure and may be modified to be one in some other embodiments.

According to the microphone devices and the audio signal processing method as discussed in the above embodiments, the first microphones are arranged along the first spiral about the reference point, the second microphones are arranged along the second spiral non-overlapped with the first spiral about the reference point, and the first microphones and the second microphones are point-symmetrical with respect to the reference point, such that the microphone device can achieve a desired sound receiving quality in a specific frequency band with less microphones, thereby maintaining the sound receiving quality and preventing the manufacturing costs from significantly increasing.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A microphone device, comprising:

a first circuit board, having a reference point;

a plurality of first microphones, disposed on the first circuit board and arranged along a first spiral about the reference point; and a plurality of second microphones, disposed on the first circuit board and arranged along a second spiral about the reference point, wherein the second spiral is non-overlapped with the first spiral;

wherein the plurality of first microphones and the plurality of second microphones are point-symmetrical with respect to the reference point, the plurality of first microphones and the plurality of second microphones form a plurality of microphone sets, and each of the plurality of microphone sets comprises one of the plurality of first microphones and one of the plurality of second microphones which are point-symmetrical with respect to the reference point.

2. The microphone device according to claim 1, wherein each of the first spiral and the second spiral is an Archimedean spiral, a logarithmic spiral, a Fermat spiral, a hyperbolic spiral, a lituus or a combination thereof.

3. The microphone device according to claim 1, wherein in adjacent two of the plurality of microphone sets, a difference between a distance between the first microphone and the second microphone of one of the adjacent two of the plurality of microphone sets and a distance between the first microphone and the second microphone of another of the adjacent two of the plurality of microphone sets falls within a range from 0.25 cm to 0.5 cm.

4. The microphone device according to claim 1, wherein two lines that respectively connect any adjacent two of the plurality of first microphones arranged along the first spiral in sequence to the reference point form an angle falling within a range from 40 degrees to 70 degrees.

5. The microphone device according to claim 1, wherein two lines that respectively connect any adjacent two of the plurality of first microphones arranged along the first spiral in sequence to the reference point form an angle, and the angles are equal to each other.

6. The microphone device according to claim 1, further comprising at least one second circuit board and a plurality of third microphones, wherein the at least one second circuit board is connected to a part of a periphery of the first circuit board, and the plurality of third microphones are disposed on the at least one second circuit board.

7. The microphone device according to claim 6, wherein the plurality of third microphones are arranged along a periphery of the at least one second circuit board.

8. The microphone device according to claim 6, wherein the first circuit board has a symmetrical polygon shape, the at least one second circuit board has a side, and the side of the at least one second circuit board is connected to the part of the periphery of the first circuit board.

9. The microphone device according to claim 8, where a plurality of reference lines are defined to be parallel to the side of the at least one second circuit board, any adjacent two of the plurality of reference lines are spaced apart from each other by a distance, the distances gradually increase along a direction away from the side of the at least one second circuit board, and the plurality of third microphones are disposed on the plurality of reference lines.

10. An audio signal processing method, comprising:

receiving an original audio signal via the plurality of microphone sets of the microphone device of claim 1;

performing a Fourier transformation and a frequency band classification to the original audio signal so as to obtain beams of all of frequency bands of the original audio signal received by each of the plurality of microphones sets;

according to an applicable frequency band of each of the plurality of microphone sets recorded in a predetermined comparison table, selecting a beam of the applicable frequency band of each of the plurality of microphone sets from the beams of all of the frequency bands of the original audio signal received by each of the plurality of microphone sets, to perform a beamforming process for obtaining a combined beam pattern;

performing an inverse Fourier transformation to the combined beam pattern so as to obtain a processed audio signal; and outputting the processed audio signal.

11. The audio signal processing method according to claim 10, wherein the applicable frequency band of each of the plurality of microphone sets recorded in the predetermined comparison table is obtained from a similarity analysis, and the similarity analysis comprises:

determining whether a similarity between a test beam pattern of each of the frequency bands produced after each of the plurality of microphone sets receives a test audio signal and an ideal beam pattern is greater than a threshold;

if yes, the frequency band corresponding to the test beam pattern is determined to be the applicable frequency band of one of the plurality of microphone sets corresponding to the test beam pattern; and if not, the frequency band corresponding to the test beam pattern is determined not the applicable frequency band of one of the plurality of microphone sets corresponding to the test beam pattern.

* * * * *